No. 655,709. Patented Aug. 14, 1900.
F. M., J. S. & W. W. HILTON & R. M. MERRIMAN.
VEHICLE WHEEL.
(Application filed Dec. 26, 1899.)

(No Model.)

F. M. Hilton
J. S. Hilton
W. W. Hilton
R. M. Merriman
Inventors

Witnesses

UNITED STATES PATENT OFFICE.

FRANK M. HILTON, JOHN S. HILTON, WILLIAM W. HILTON, AND ROBERT M. MERRIMAN, OF AKRON, OHIO.

VEHICLE-WHEEL.

SPECIFICATION forming part of Letters Patent No. 655,709, dated August 14, 1900.

Application filed December 26, 1899. Serial No. 741,621. (No model.)

*To all whom it may concern:*

Be it known that we, FRANK M. HILTON, JOHN S. HILTON, WILLIAM W. HILTON, and ROBERT M. MERRIMAN, citizens of the United States, residing at Akron, in the county of Summit and State of Ohio, have invented certain new and useful Improvements in Vehicle-Wheels; and we do hereby declare the following to be a full, clear, and exact description of the invention, such as will enable others skilled in the art to which it appertains to make and use the same.

This invention relates chiefly to the rim or tire portion of vehicle-wheels having rubber or like yielding tread-surfaces, the purpose being to provide simple and effective means for the ready attachment of the rubber tire to the felly or rim.

The rubber tire has its inner portion of approximately wedge form in cross-section and has metallic wires, stays, or stiffeners transversely embedded therein at intervals, said stays being crimped, a channel-iron fitted to the rim and forming a seat for the tire, one wall of the channel-iron having an inturned flange, and a binding-wire coöperating with the other wall of the channel-iron to secure the tire when positioned.

For a full description of the invention and the merits thereof and also to acquire a knowledge of the details of construction of the means for effecting the result reference is to be had to the following description and to the drawings hereto attached.

While the essential and characteristic features of the invention are necessarily susceptible of modification, still the preferred embodiment of the invention is illustrated in the accompanying drawings, in which—

Figure 1:
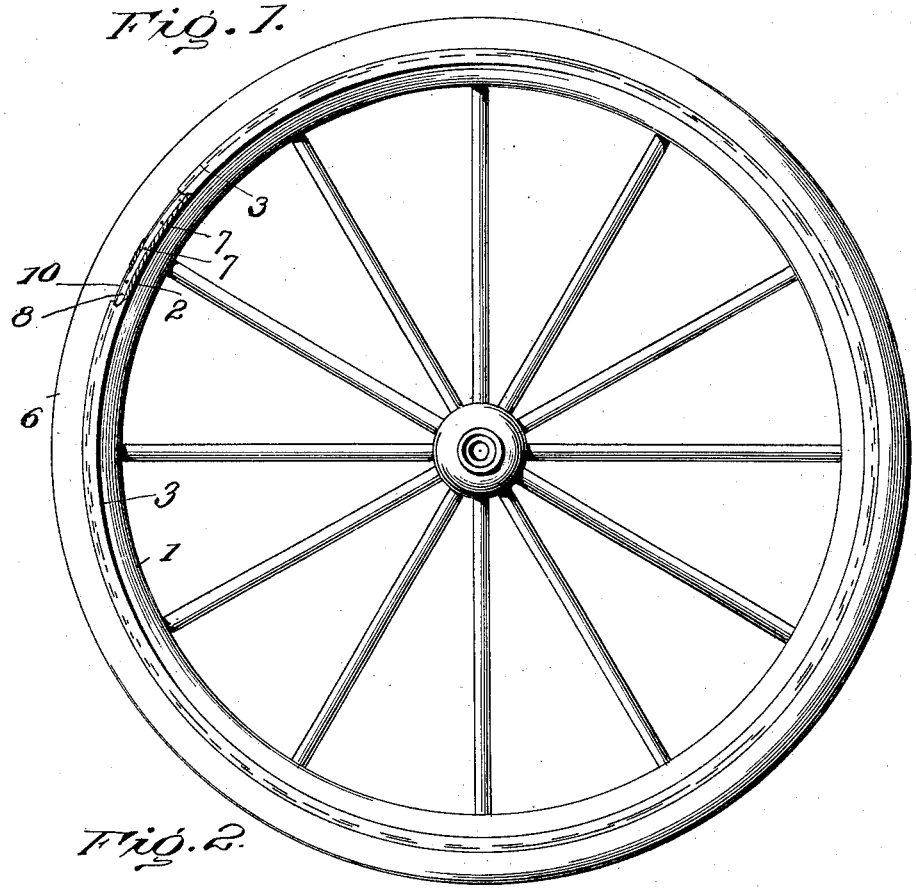
Figure 2:
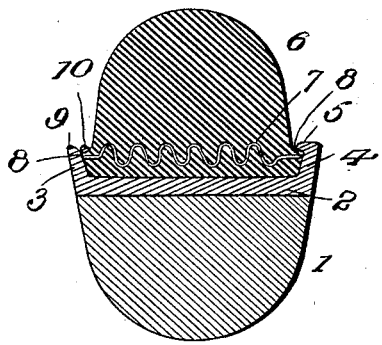
Figure 3:
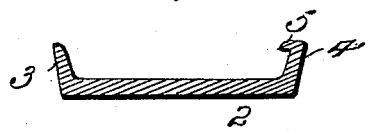
Figure 4:

Figure 1 is a side elevation of a wheel having the elastic tire secured thereto in accordance with this invention. Fig. 2 is a transverse section of the rim portion of the wheel, showing the relation of the coöperating parts. Fig. 3 is a cross-section of the channel-iron. Fig. 4 is a sectional perspective view of the tire.

Corresponding and like parts are referred to in the following description and indicated in all the views of the drawings by the same reference characters.

The wheel may be of any pattern and make and is composed of a hub, spokes, and a rim portion, the latter embodying the invention.

The component parts of the rim are the felly 1, channel-iron 2, with its vertical walls 3 4 and inturned flange 5, and the tire 6, with its transverse stays or stiffeners 7 embedded therein at proper intervals.

The channel-iron 2 encircles the felly and may be rolled or otherwise formed, the walls 3 and 4 flaring, forming a wedge-shaped seat for the tire, and the wall 4 terminating in an inturned flange 5 to overhang and interlock with a side basal extension 8 of the tire. The inner face of the wall 3 curves at its outer extremity, as shown at 9, to admit of the ready seating of the tire when forcing it home in the channel-iron.

The tire has its inner or base portion of wedge form to snugly fit within the space of the channel-iron and has offset extensions 8, forming interlocking shoulders. The tire is braced transversely by stays or stiffeners 7, embedded therein and crimped or fluted to obtain a greater surface contact between them and the tire than would be possible by the use of straight stays. Moreover, foreign matter, such as sand and water, is prevented from entering the tire by following the stays. Furthermore, the stays can be made of spring-wire of suitable gage, which by their spring action will hold the tire laterally extended and against the walls 3 and 4 when properly seated. The crimps of the stiffeners extend at a right angle to the length of the tire instead of lying in a plane parallel with the base, thereby enabling the stays to be closely related without having the folds of adjacent stays touching or coming in such close proximity as to weaken the tire. This disposition of the stays also increases the difficulty of foreign matter following the stays through the tire, as the spaces between the elements of the crimps constitute traps. The end portions of the transverse stays come flush with the sides of the base portion of the tire and are substantially straight, so as to underlap the flange 5 and the binding-wire 10.

In assembling the parts the channel-iron 2 is secured to the felly 1 in any desired manner, and the tire is placed in position, with one of the side offsets 8 engaging under the flange 5, sufficient force being brought to bear to seat the tire in the iron. The binder 10 (a wire) is fitted over the other offset 8 and encircles the wheel, and its ends are drawn together and fastened, thereby securing the tire in place. The curved edge 9 of the wall 3 directs the binder 10 to proper position when tightening it, and the latter operation may serve as the means for forcing the tire home when seating it.

Having thus described the invention, what is claimed as new is—

1. An elastic tire having metal stays embedded transversely therein and crimped or fluted intermediate of their extremities, substantially as described.

2. An elastic tire having metal stays embedded transversely therein and crimped throughout their length, the crimps extending at a right angle to the length of the tire, substantially as specified.

3. In a vehicle-wheel, a channel-iron having its seat of approximately wedge form, one of the walls terminating in an inturned flange and the other wall having the outer edge portion of its inner face curved, an elastic tire having its base portion of wedge form to snugly fit the seat of the channel-iron and formed with lateral offsets, one of the offsets engaging under the aforesaid inturned flange, a binder engaging over the other offset, and crimped stays embedded transversely in the base portion of the tire with their end portions extending under, respectively, the said inturned flange and binder, substantially as described.

In testimony whereof we affix our signatures in presence of two witnesses.

FRANK M. HILTON. [L. S.]
JOHN S. HILTON. [L. S.]
WILLIAM W. HILTON. [L. S.]
ROBERT M. MERRIMAN. [L. S.]

Witnesses:
D. T. RAMSEY,
A. E. KLING.